United States Patent
Monir

(10) Patent No.: US 9,506,601 B2
(45) Date of Patent: *Nov. 29, 2016

(54) SUSPENSION ADAPTER FOR RADIATION PROTECTIVE GARMENTS

(71) Applicant: George Monir, Maitland, FL (US)

(72) Inventor: George Monir, Maitland, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/925,428

(22) Filed: Oct. 28, 2015

(65) Prior Publication Data

US 2016/0058078 A1 Mar. 3, 2016

Related U.S. Application Data

(63) Continuation of application No. 14/329,520, filed on Jul. 11, 2014, now Pat. No. 9,198,470.

(51) Int. Cl.
| | |
|---|---|
| A47H 1/10 | (2006.01) |
| F16M 13/02 | (2006.01) |
| G21F 3/025 | (2006.01) |
| A47G 25/90 | (2006.01) |
| A41D 13/00 | (2006.01) |
| G21F 3/03 | (2006.01) |
| G21F 3/00 | (2006.01) |
| G21F 5/00 | (2006.01) |
| G21F 3/02 | (2006.01) |

(52) U.S. Cl.
CPC ........ *F16M 13/027* (2013.01); *A41D 13/0007* (2013.01); *A47G 25/90* (2013.01); *G21F 3/025* (2013.01); *G21F 3/00* (2013.01); *G21F 3/02* (2013.01); *G21F 3/03* (2013.01); *G21F 5/00* (2013.01)

(58) Field of Classification Search
CPC ............. A41D 13/0002; F16M 13/02; F16M 13/027; G21F 3/03; G21F 3/00; G21F 5/00; G21F 3/025; G21F 3/02; A47G 25/90
USPC .......... 250/505.1, 516.1; 223/85, 88, 92, 93; 248/230.8, 74.3, 317; 24/23 B, 464, 24/465, 256 B
See application file for complete search history.

(56) References Cited

U.S. PATENT DOCUMENTS

| | | | | |
|---|---|---|---|---|
| 1,601,612 | A * | 9/1926 | Edwards | E04H 17/10 24/19 |
| 7,191,922 | B1 * | 3/2007 | Sutton | A47G 25/483 223/91 |
| 2002/0084393 | A1 * | 7/2002 | Torres | A63B 71/04 248/230.8 |
| 2007/0290100 | A1 * | 12/2007 | Caveney | H02G 3/0437 248/74.3 |
| 2009/0256044 | A1 * | 10/2009 | Miller | G21F 3/02 248/317 |
| 2011/0192125 | A1 * | 8/2011 | Smithies | B01D 39/1692 55/486 |

\* cited by examiner

*Primary Examiner* — Christopher E Garft
(74) *Attorney, Agent, or Firm* — Jason T. Daniel, Esq.; Daniel Law Offices, P.A.

(57) ABSTRACT

An adapter device for radiation protective garments includes a user engagement unit that is interposed between a lower member and an upper member via a connector. The lower member includes a generally curved main body having one or more shafts extending upward. The user engagement unit includes an upper shoulder strap having one or more shaft apertures. The upper member includes a generally curved main body having one or more shaft apertures and a protrusion extending from the top surface of the upper member. The lower member, upper member and user engagement unit are functionally secured by shaft connectors.

12 Claims, 6 Drawing Sheets

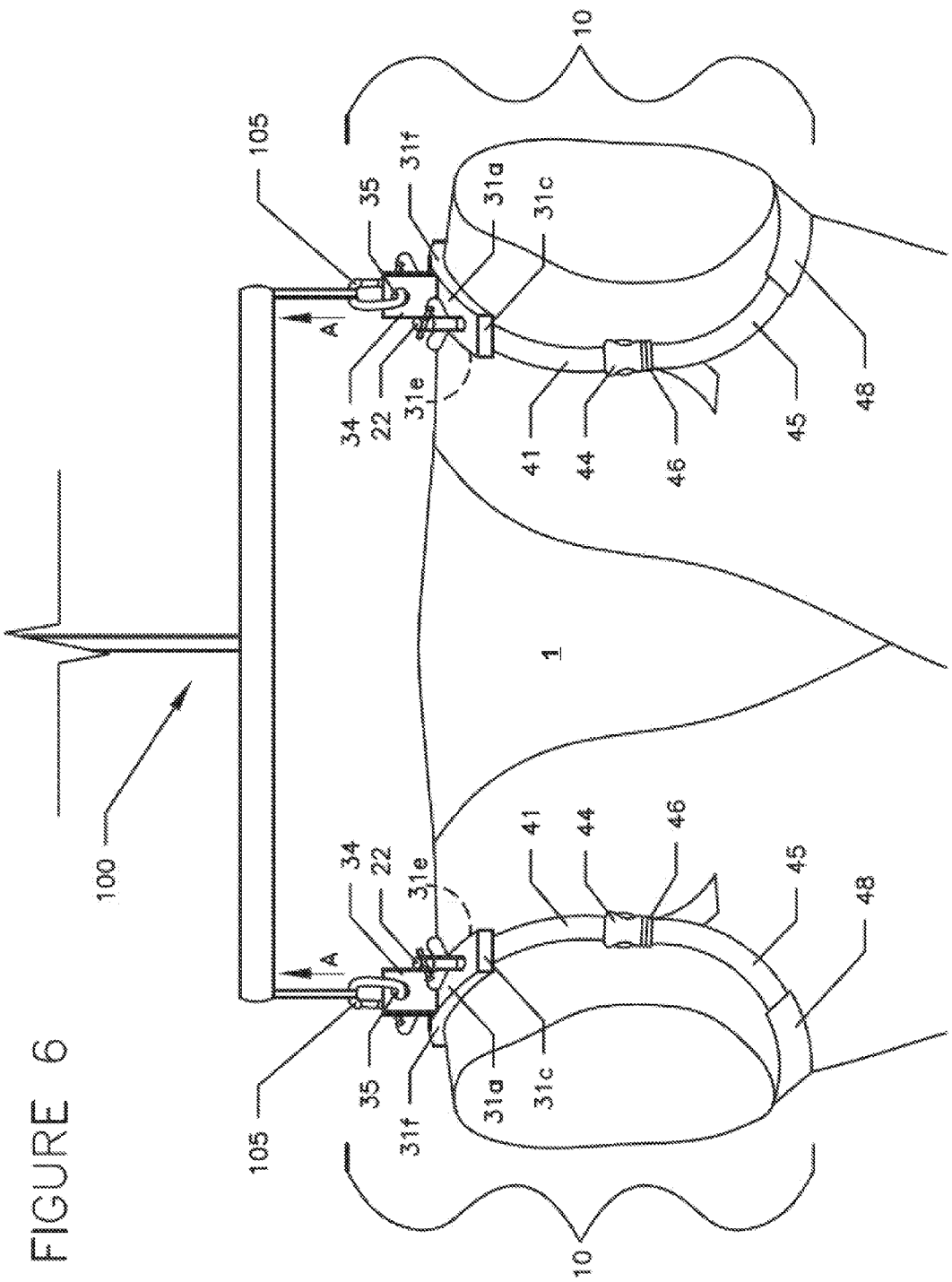

SUSPENSION ADAPTER FOR RADIATION PROTECTIVE GARMENTS

CROSS-REFERENCE TO RELATED APPLICATIONS

This application is a continuation of, and claims the benefit to copending U.S. application Ser. No. 14/329,520 filed on Jul. 11, 2014, the contents of which are incorporated herein by reference.

TECHNICAL FIELD

The present invention relates generally to radiation protective vests, and more particularly to an adapter for connecting a conventional radiation protective vest to an overhead suspension system in a medical environment.

BACKGROUND

The statements in this section merely provide background information related to the present disclosure and may not constitute prior art.

Medical professionals such as doctors and nurses routinely wear protective garments while performing medical procedures such as cardiac catheterizations, for example. These garments are typically constructed as vests or aprons, which include radiation-absorbing materials such as lead or other metals, for example.

Although useful for preventing unwanted radiation exposure, these garments are often uncomfortable, ill-fitting and heavy, thereby placing a significant stress on the users' back and shoulders. Moreover, unlike patients who wear these garments for short periods of time, medical professionals must often wear these garments for several hours each day, thereby increasing the toll on their bodies over time.

For these reasons, it is not uncommon for medical professionals to purchase their own protective garments that are custom fit to suit the contours of the persons' body. Although this approach greatly improves the uncomfortable and ill-fitting problems associated with the traditional protective garments, it does not alleviate the back and shoulder problems discussed above.

Conversely, there are several known suspended radiation suit systems which utilize a cable and pulley to support the weight of an integrated body suit. In this regard, a medical professional wearing the suit will have limited movement about the operating room. However, the user must disconnect the suit (if possible) if he or she needs to move beyond the limitation of the suspension system in an emergency requiring free mobility, especially when radiation use is needed requiring the operator to maintain wearing his or her radiation protective garment.

Accordingly, the need exists for a device which can mate a traditional or custom made protective garment with a conventional suspension system in order to alleviate the drawbacks of the above noted devices, allowing the operator to use his/her own custom fitted suit.

SUMMARY OF THE INVENTION

The present invention is directed to an adapter device for radiation protective garments. One embodiment of the present invention can include a user engagement unit that is interposed between a lower member and an upper member via a connector. The lower member can include a generally curved member having one or more shafts extending upward. The user engagement unit can include a shoulder strap having one or more apertures which can receive the one or more shafts. The upper member can also include a generally curved member having one or more apertures which can also receive the one or more shafts. The connector can move along the shafts and impart a tightening force onto each of the upper member and the shoulder strap to secure the elements together, and a protrusion extending from the top surface of the upper member can engage an overhead suspension system.

In yet another embodiment, a pair of adapter devices can engage a protective garment along the shoulder portion, and each of the protrusions can engage the overhead suspension system, in order to allow the system to reduce the weight of the garment while being worn by a user.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 6 is a front view of the suspension adapter for radiation protective garments in operation, in accordance with one embodiment of the invention.

DETAILED DESCRIPTION OF THE INVENTION

Figure 1:
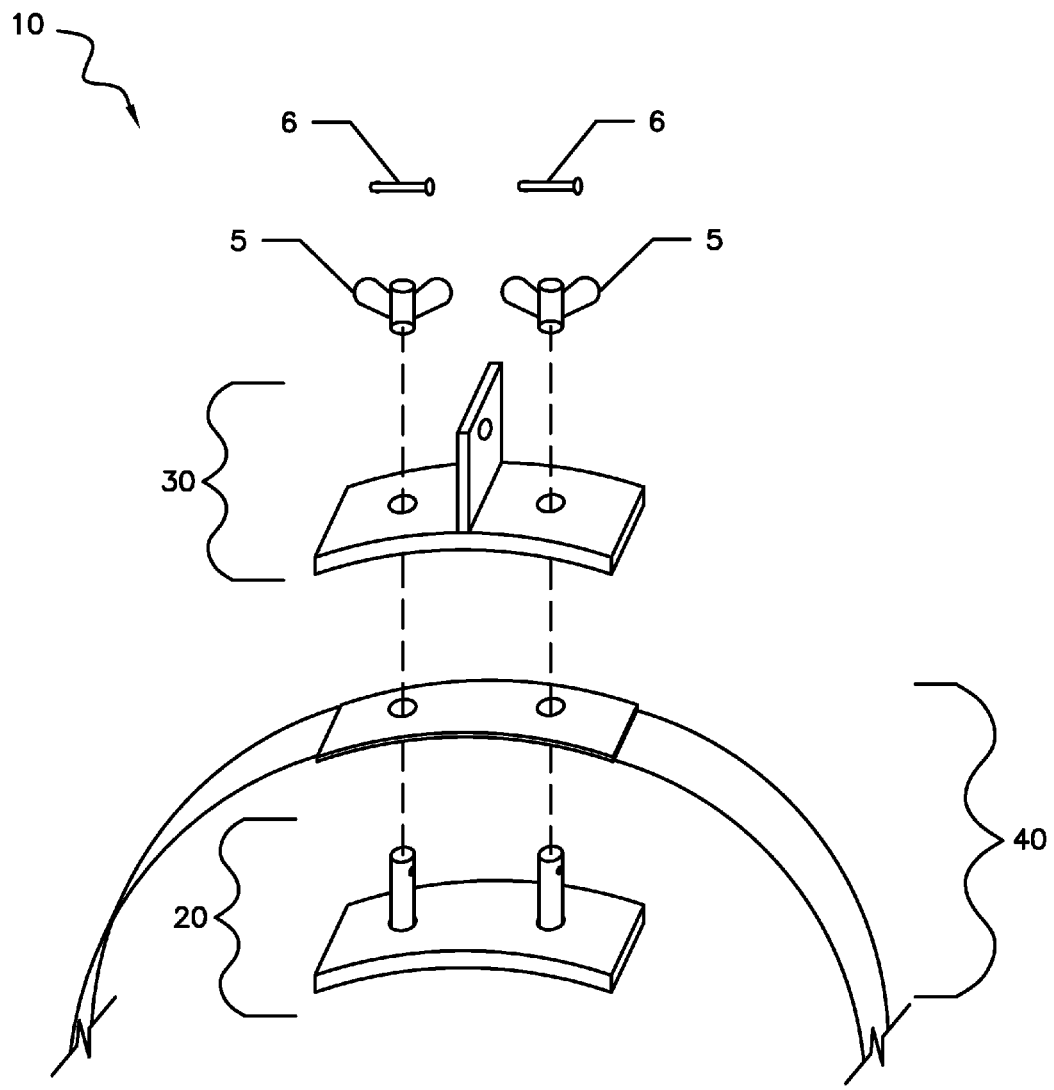
FIG. 1 is an exploded parts view of one embodiment of the suspension adapter for radiation protective garments that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described herein, the term "removably secured," and derivatives thereof shall be used to describe a situation wherein two or more objects are joined together in a non-permanent manner so as to allow the same objects to be repeatedly joined and separated. As will be described throughout this disclosure, the present invention shall function as an adapter for mating a conventional non-modified radiation protective garment with a new or existing medical suspension system. One example of a suitable suspension system for use with this invention is described in U.S. Pat. No. 8,198,616, to Rees, the contents of which are incorporated herein by reference.

FIGS. 1-4 illustrate one embodiment of a suspension adapter for radiation protective garments 10 that is useful for understanding the inventive concepts disclosed herein. In this regard, FIG. 1 illustrates an exploded parts view of the device 10 that includes a lower member 20, an upper member 30, and a user engagement unit (i.e., shoulder strap) 40.

Figure 2:
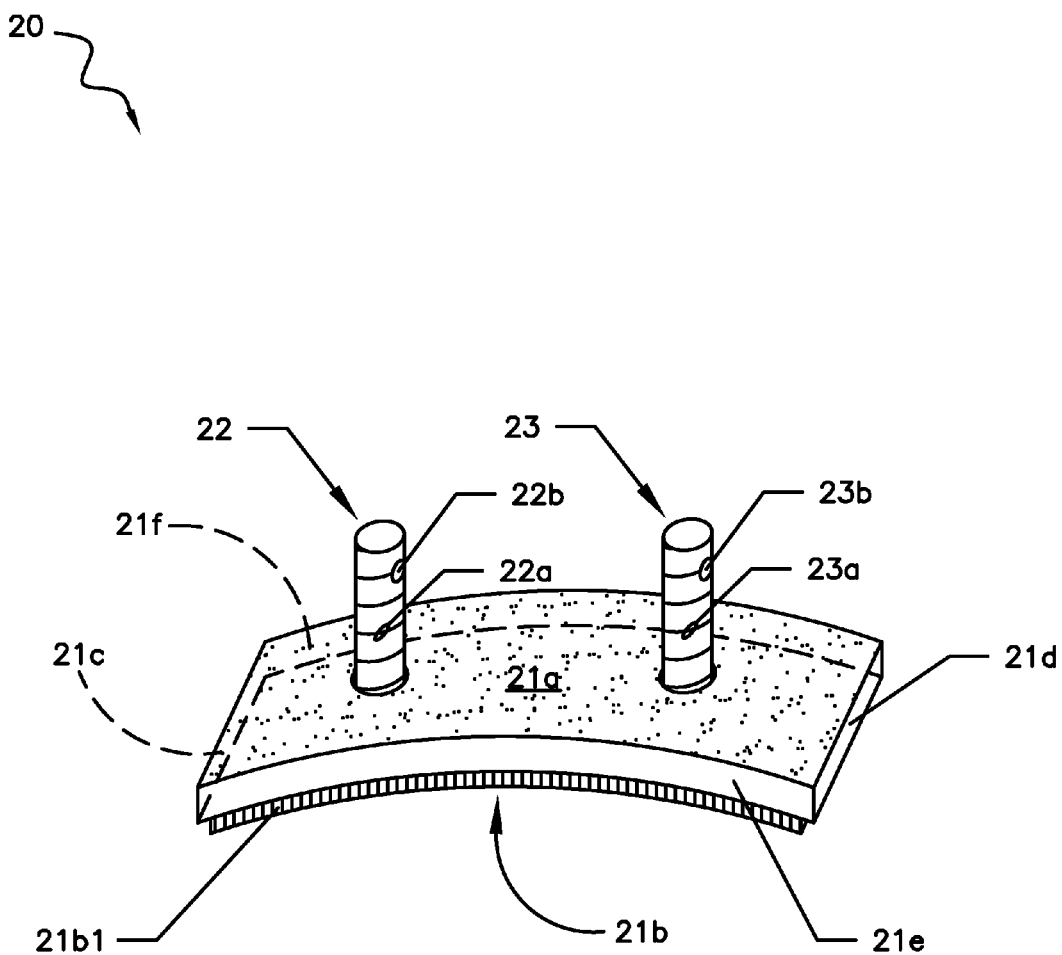
FIG. 2 is a side view of the lower member of the suspension adapter for radiation protective garments, in accordance with one embodiment of the invention.

As shown best in FIG. 2, the lower member 20 can include an elongated curved and generally rectangular main body 21 having a top surface 21a, a bottom surface 21b, a first end 21c, a second end 21d, and a pair of opposing side sections 21e and 21f. In one embodiment, the top surface of the main body 21a can include a rough texture or adhesive, so as to better engage the radiation protective garment or the shoulder strap, and the bottom surface can include a soft coating 21b1, such as foam or padding, for example, in order to provide comfort to a user.

One or more elongated shafts 22 and/or 23 can extend from the top surface of the main body. When both shafts are provided, it is preferred that each of the shafts be positioned generally parallel to each other; however, each of the one or more shafts 22 and/or 23 can be located anywhere along the main body, and at any orientation. Although two shafts 22 and 23 are illustrated in the FIGS. and are described below, this is for ease of illustration, so as to describe the preferred embodiment. However, the device can include a single shaft 22 and/or 23, along with any number of additional shafts as may be desirable to a manufacturer.

In either instance, each shaft that is provided along the main body can include a plurality of embedded elements forming screw threads such as 22a and 23a along the outer surface. As will be described below in detail, each of the shafts 22 and/or 23 can function to receive the shoulder strap 40 and the upper member 30, and the screw threads can function to engage a pair of shaft connectors such as wing nuts 5, for example, that can function to secure each of the elements together to prevent an inadvertent separation.

In another embodiment, each of the elongated shafts can further include an aperture 22b and 23b located along the upper edge. Each of these apertures can function to receive a locking pin 6 or other such hardware as a safety measure, in the unlikely event that the lock nut becomes loose on the shaft. Locking pins are extremely well known in the art, therefore a further description is not provided.

As will be well known to those of skill in the art, threaded elements typically include a plurality of lands and grooves which function to engage a secondary object having a plurality of complementary lands and grooves via a twisting motion. Although described above as utilizing threaded elements, lock nuts, and/or locking pins this is for illustrative purposes only. To this end, any type of connector that is capable of securing each of the above noted items together in a removable manner can also be utilized. Several non-limiting examples of other suitable connectors include, but are not limited to snaps, buttons, tethers, compression fittings, magnetic elements, and the like, without limitation. Accordingly, the apparatus is not limited to using threaded elements.

Figure 3:
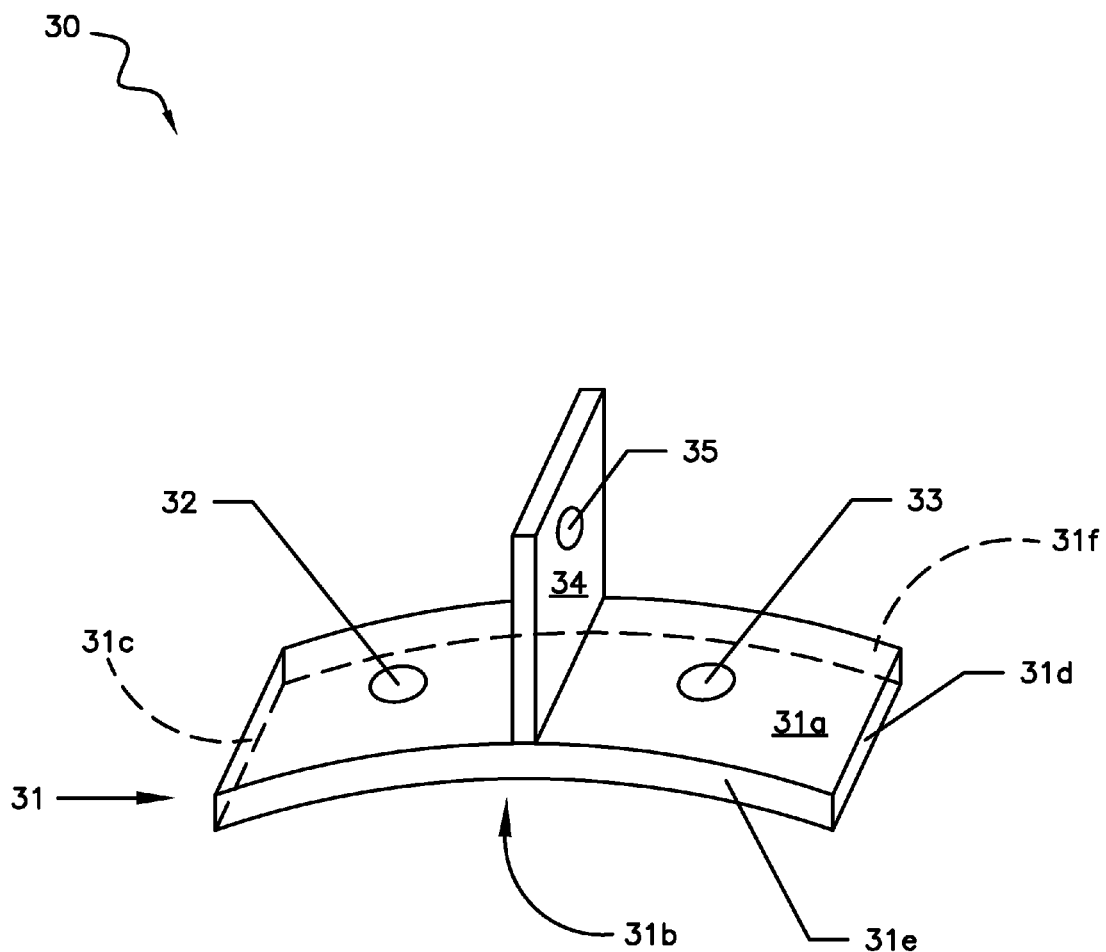
FIG. 3 is a side perspective view of the upper member of the suspension adapter for radiation protective garments, in accordance with one embodiment of the invention.

As shown best in FIG. 3, the upper member 30 can also include an elongated curved and generally rectangular main body 31 having a top surface 31a, a bottom surface 31b, a first end 31c, a second end 31d, and a pair of opposing side sections 31e and 31f. One or more shaft apertures 32 and/or 33 can be disposed along the main body 31, and can extend from the top surface 31a through the bottom surface 31b. Each of the shaft apertures including a shape, dimension and spacing along the main body that is complementary to, and suitable for receiving each of the shafts 22 and/or 23, respectively. Of course, any number of additional apertures can also be provided to accommodate a greater number of shafts when provided.

An engagement member 34 can be provided along the upper surface of the main body 31 and can function to allow the device 10 to be connected to an overhead suspension system. In one embodiment, the engagement member can include a protrusion that is centered along the length of the main body 31 and between the sides 31c and 31d. The protrusion can extend from the top surface and can include a width that extends from the side section 31e to the side section 31f. Of course, any number of other dimensions, shapes and locations along the main body 31 are also contemplated. Additionally, the protrusion can include an aperture 35 for receiving a hook from an overhead suspension system.

Additionally, the engagement member 34 can also include or comprise a looped cord, and/or other type of tether device having a removable connector such as a clip or buckle, for example, along one end for engaging the overhead system. Of course, those of skill in the art will recognize that any number of different components capable of securing the overhead suspension hook onto the upper member in a removable manner can be utilized herein without undue experimentation.

In one preferred embodiment, each of the lower member 20 and the upper member 30 can include essentially identically shaped and sized main body sections 21 and 31, respectively, in order to allow the device to operate as described below. Such features being referred to as having complementary dimensions. Moreover, it is preferred that each of the members be constructed from a lightweight rigid and/or semi rigid material which may or may not absorb or reflect X-rays, such as injection molded plastic, for example; however, the invention is not limited to these construction materials, as any number of other materials that are suitable for use within a medical facility can also be utilized. In another embodiment, each of the members 20 and 30 can be constructed from, or include an outer coating of lead or other radiation shielding material, in order to allow the device itself to protect the user from the harmful effects of radiation.

Figure 4:
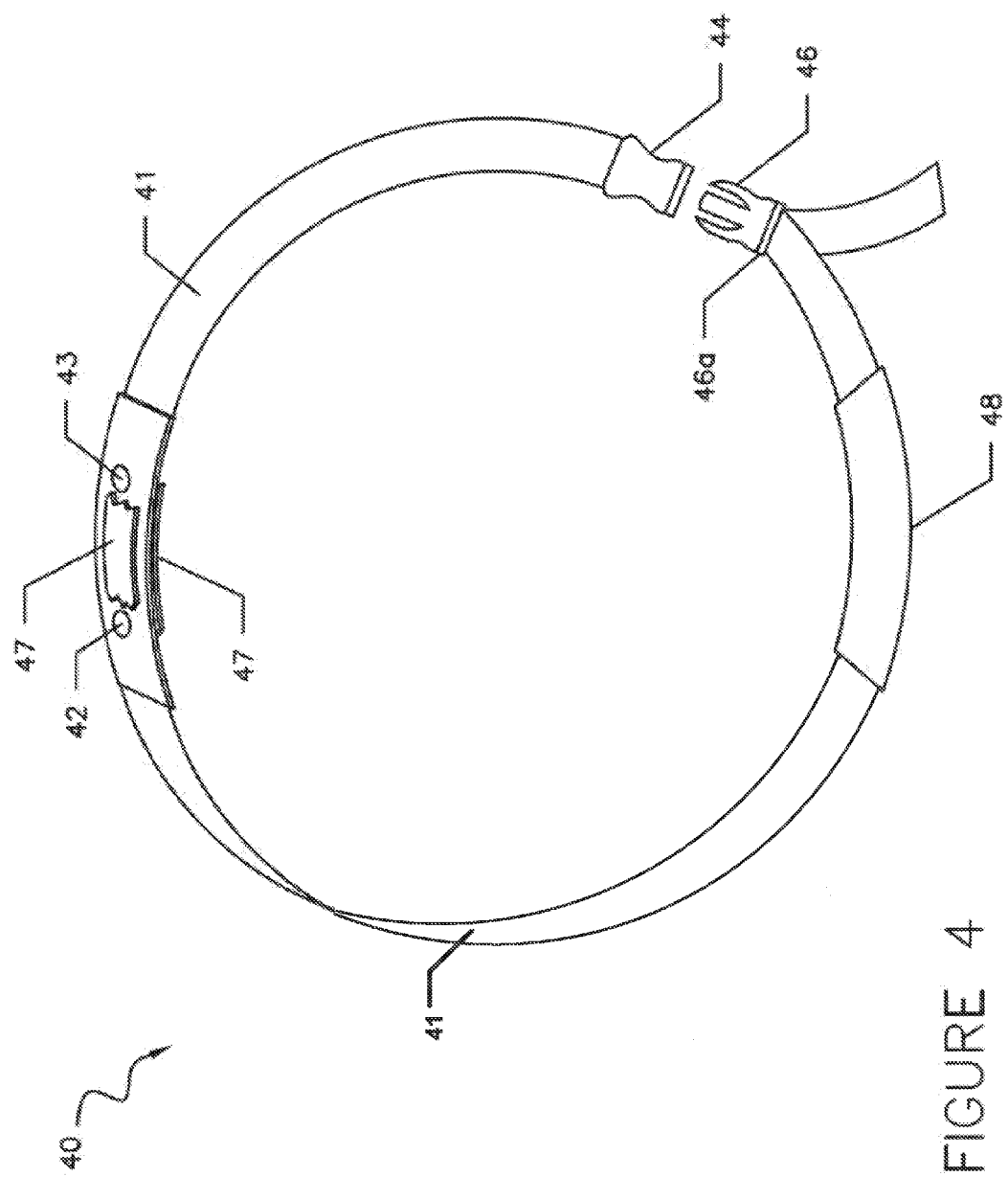
FIG. 4 is a perspective view of the user engagement unit of the suspension adapter for radiation protective garments, in accordance with one embodiment of the invention.

As shown best in FIG. 4, the user engagement unit 40 can include an elongated shoulder strap 41 that has one or more apertures 42 and/or 43 disposed thereon. Each of the one or more apertures can extend from the top surface through to the bottom surface of the strap, and can further include a shape, dimension and spacing (relative to one another) that is complementary to, and suitable for receiving each of the shafts 22 and/or 23, respectively, of the lower member 20.

A shoulder strap fastener, such as a readily releasable buckle receiver 44 and tongue 45 can be provided. The fastener can also include a channel 46a for increasing or decreasing the length of the shoulder strap 41, in order to allow a user to loosen or tighten the strap while in use. In the preferred embodiment, the shoulder strap 41 can be constructed from nylon webbing and the buckle 44 and tongue 46 can comprise conventional quick release fasteners. Although described above with respect to particular materials, this is for illustrative purposes, as the shoulder strap can be constructed from any number of different materials, and the strap fastener can include or comprise any number of elements that are capable of repeatedly securing the strap ends together in a nonpermanent manner. Several nonlimiting examples include snaps, buttons, strips of hook and loop material (i.e., Velcro®), compression fittings, magnetic elements, and the like, without limitation.

In another embodiment, strips of adhesive material 47 such as double sided tape, for example, can be positioned along the shoulder strap 41, and can function to prevent the device 10 from sliding laterally along the protective garment when the device is in operation. Of course, any number of other materials having a high coefficient of friction can be substituted for the tape. Additionally, a soft and/or padded area 48 can be provided along the shoulder strap. The padding can include any number of soft materials such as foam, rubber or cotton, for example, and can function to provide additional comfort to the user during device operation.

Figure 5:
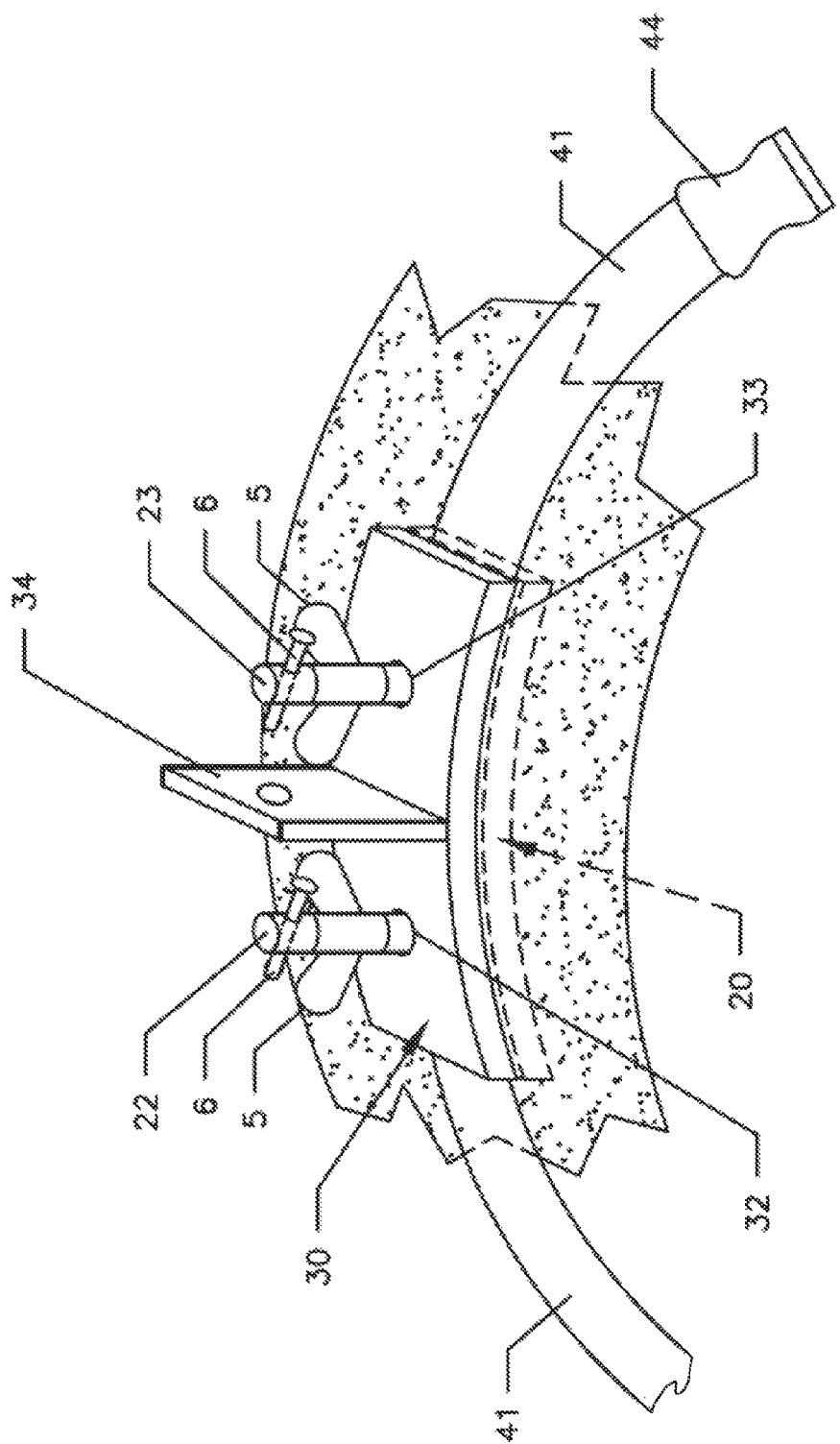
FIG. 5 is a side view of the suspension adapter for radiation protective garments in operation, in accordance with one embodiment of the invention.

FIG. 5 illustrates a perspective side view of one embodiment of the device 10 being secured onto one of the shoulder sections of a traditional protective radiation garment 1 (e.g., lead vest) which has been cut to include aperture(s) for receiving the shafts 22 and/or 23 of the lower member 20. For the sake of clarity, two shafts 22 and 23 are provided, and only a portion of one of the shoulder sections of the garment 1 is illustrated; however, installation is identical for one or more shafts 22 and/or 23, and for both shoulder sections.

As shown, the protective garment 1 can be placed onto the top surface of the lower member 20 so that the elongated shafts 22 and/or 23 extend upward through the apertures cut into the garment. Next, the shoulder strap 41 can be placed onto the top of the protective garment 1, so that the elongated shafts 22 and/or 23 extend upward through the shaft apertures 42 and 43, respectively. Next, the upper member 30 can be placed onto the top surface of the shoulder strap 41, so that the elongated shafts 22 and/or 23 extend upward through the shaft apertures 32 and/or 33, respectively. Finally, the elements 20, 30 and 40 are secured together via connectors such as the illustrated wing nuts 5 and/or locking pins 6, for example. At this time, the protrusion 34 is ready to engage an overhead suspension system.

FIG. 6 illustrates one embodiment of how the device 10 can function to secure a traditional protective radiation garment 1 (e.g., lead vest) to an existing overhead suspension system 100. As shown, once the device 10 has been secured onto each shoulder section of the garment 1, as described above, the hook 105 of the suspension system can be placed through the hook aperture 35 of the upper member.

In operation, the suspension system 100 can impart a lifting force A onto each device 10 via the hook 105. At this time, the centralized location of the protrusion 34 will function to ensure that both the proximal and distal ends of each device 10 are lifted evenly. Moreover, the lower portion of the shoulder strap 41 is designed to be positioned beneath the arm and/or armpit of the user wearing the garment 1.

When so positioned, the shoulder strap 41 can be adjusted to suit the comfort preferences of the user, and can further function to prevent a situation wherein the suspension system 100 inadvertently lifts the protective garment 1 off of the user and/or lifts the garment high enough to make contact with the neck or face of the user. Although the shoulder unit 40 is illustrated as being secured to the outside facing surface of the garment 1, this is for ease of illustration, as the strap 41 can also be worn underneath the garment, at the discretion of the user.

Accordingly, the above described suspension adapter for radiation protective garments 10 functions to allow traditional and/or user personalized protective garments to be utilized by any form of existing overhead suspension system, in order to reduce the fatigue associated with wearing the garments for long periods of time. Moreover, because the device allows the garments to be quickly and easily removed from the system, it becomes possible for users to move beyond the limits of the overhead system, and/or to remove the garment from the medical facility for use or cleaning elsewhere.

As described herein, one or more elements of the suspension adapter for radiation protective garments 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that any combination of one or more individual elements of the device such as the upper member, lower member, and/or shoulder unit, for example, may be formed together as continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An adapter device for radiation protective garments, said adapter device comprising:
    first and second adapter units, each of the first and second adapter units comprising
      a lower member having a main body that includes a top surface, a bottom surface, and one or more elongated shafts extending orthogonally from the top surface;
      a discrete upper member having a main body that includes a top surface a bottom surface, and one or more shaft apertures;
      an engagement member that is disposed along the top surface of the main body of the discrete upper member, said engagement member having an aperture that is configured to engage a hook from an overhead suspension system; and
      a shoulder strap having a strap fastener disposed thereon,
      wherein the one or more shaft apertures of each of the upper member and the shoulder strap are aligned to receive the one or more elongated shafts, and
      each of the first and secondary adapter units are configured to independently engage an overhead suspension system.

2. The device of claim 1, further comprising:
    one or more shaft connectors that are configured to removably engage each of the one or more elongated shafts.

3. The device of claim 1, wherein the engagement member includes, at least one of a looped cord, and a protrusion having an aperture disposed along a distal end thereof.

4. The device of claim 1, wherein the strap fastener includes a buckle receiver and a buckle tongue.

5. The device of claim 1, further comprising:
    a padded section that is positioned along a bottom portion of the shoulder strap.

6. The device of claim 1, further comprising:
    one or more strips of adhesive material that are disposed along an upper portion of the shoulder strap, said material being configured to engage a protective garment that is in contact with the shoulder strap.

7. The device of claim 1, wherein the main body of each of the lower member and the upper member include complementary dimensions to each other.

8. The device of claim 1, wherein the top surface of the lower member includes a rough textured surface; and
    the bottom surface of the lower member includes a soft coating.

9. The device of claim 1, wherein the main body of the upper member includes a bend that extends from a first end to a second end thereof.

10. The device of claim 9, wherein the main body of the lower member includes a bend that extends from a first end to a second end thereof.

11. The device of claim 10, wherein the main body of each of the upper member and the lower member include an identical shape, size and bend.

12. The device of claim 10, wherein the one or more shaft apertures of each of the upper member and the shoulder strap are aligned so as to position the shoulder strap in a parallel orientation with the first and second ends of the upper and lower members.

* * * * *